(12) United States Patent
Siddoway

(10) Patent No.: US 6,707,007 B1
(45) Date of Patent: Mar. 16, 2004

(54) ELECTRICALLY HEATED SOLDERING PLIERS WITH REMOVABLY ATTACHABLE JAW PORTIONS

(76) Inventor: Laine Siddoway, 1243 Falula Dr., Laketown, UT (US) 84038

( * ) Notice: Subject to any disclaimer, the term of this patent is extended or adjusted under 35 U.S.C. 154(b) by 0 days.

(21) Appl. No.: 10/339,891

(22) Filed: Jan. 10, 2003

(51) Int. Cl.[7] .............................................. H05B 3/00
(52) U.S. Cl. ........................ 219/231; 219/227; 81/423
(58) Field of Search ................................ 219/238, 231, 219/227–229; 81/423; 228/51, 55

(56) References Cited

U.S. PATENT DOCUMENTS

| | | | | |
|---|---|---|---|---|
| 381,544 A | * | 4/1888 | Garvey | 81/423 |
| 753,456 A | * | 3/1904 | Weidinger | 81/423 |
| 1,378,040 A | * | 5/1921 | Langguth | 219/229 |
| 1,455,696 A | * | 5/1923 | Wright | 219/228 |
| 1,465,838 A | * | 8/1923 | Caneavri | 219/229 |
| 1,505,510 A | * | 8/1924 | Uhl | 81/423 |
| 1,526,063 A | * | 2/1925 | Griffin et al. | 219/227 |
| 1,617,354 A | * | 2/1927 | Reynolds | 219/85.14 |
| 1,845,475 A | | 2/1932 | Benson | |
| 2,226,194 A | | 12/1940 | Berolsky | |
| 2,243,086 A | * | 5/1941 | Buettell | 219/236 |
| 2,449,521 A | * | 9/1948 | Warner | 219/161 |
| 2,477,467 A | * | 5/1949 | Rose | 219/238 |
| 2,577,515 A | * | 12/1951 | Durst | 219/234 |
| 2,606,471 A | * | 8/1952 | Kollweck | 81/423 |
| 3,114,821 A | * | 12/1963 | Senn | 219/229 |
| 3,132,550 A | * | 5/1964 | Sion | 81/423 |
| 3,412,233 A | * | 11/1968 | Wilkie | 219/230 |
| 4,086,465 A | | 4/1978 | Sylvester | |
| 4,205,221 A | | 5/1980 | Meyer | |
| 4,247,137 A | | 1/1981 | St. Clair | |
| 4,626,658 A | | 12/1986 | Gray et al. | |
| 4,702,246 A | * | 10/1987 | Ellis et al. | 606/31 |
| 4,793,541 A | | 12/1988 | Dravnieks | |
| 4,813,310 A | * | 3/1989 | Moynihan | 81/423 |
| 4,821,946 A | | 4/1989 | Abe et al. | |
| 4,921,156 A | | 5/1990 | Hohnerlein | |
| 4,967,059 A | | 10/1990 | Wagner | |
| 5,007,405 A | | 4/1991 | Hsu | |
| 5,079,977 A | * | 1/1992 | Petrie | 81/123 |
| D381,880 S | | 8/1997 | La Valley et al. | |
| 6,336,387 B1 | * | 1/2002 | Lee | 81/415 |
| 6,367,688 B1 | * | 4/2002 | Roth | 228/212 |
| 6,389,937 B1 | * | 5/2002 | Kang | 81/423 |

FOREIGN PATENT DOCUMENTS

| | | | |
|---|---|---|---|
| AR | 202991 | * | 7/1975 |
| FR | 2390150 | * | 1/1979 |
| FR | 2649350 | * | 1/1991 |

* cited by examiner

*Primary Examiner*—John A. Jeffery

(57) ABSTRACT

A soldering tool for holding wires together such that solder may be applied. The soldering tool includes a pliers comprising a pair of elongated members pivotally coupled together and each having a first end and a second end. Proximal portions of the elongate members comprise a non-heat conducting material, and distal portions of the elongate members comprise a heat conducting material. Each of the second ends has an opening extending therein. A plurality of heat conducting heads is removably attachable to the pliers. Each of the heads comprises a pair of jaw portions, each having a first end and a second end. The first ends each have a rod attached thereto removably extendable into one of the female couplers for frictionally coupling the jaw portions to the elongate member. An electric heating means is in communication with the distal portions of the elongated members.

6 Claims, 3 Drawing Sheets

ELECTRICALLY HEATED SOLDERING PLIERS WITH REMOVABLY ATTACHABLE JAW PORTIONS

BACKGROUND OF THE INVENTION

1. Field of the Invention

The present invention relates to soldering devices and more particularly pertains to a new soldering tool for holding wires together such that solder may be applied.

2. Description of the Prior Art

The use of soldering devices is known in the prior art. More specifically, soldering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,226,194; U.S. Pat. No. 4,967,059; U.S. Pat. No. 4,205,221; U.S. Pat. No. 1,845,475; U.S. Pat. No. 4,626,658; U.S. Des. Pat. No. 381,880; U.S. Pat. No. 4,086,465; U.S. Pat. No. 4,247,137; U.S. Pat. No. 4,793,541; U.S. Pat. No. 4,821,946; U.S. Pat. No. 4,921,156; and U.S. Pat. No. 5,007,405.

While these devices fulfill their respective, particular objectives and requirements, the aforementioned patents do not disclose a new soldering tool. The inventive device includes a pliers including a pair of elongated members each having a first end and a second end. Proximal portions of the elongate members with respect to the first ends comprise a non-heat conducting material, and distal portions of the elongate members comprise a heat conducting material. The elongate members are pivotally coupled together. Each of the second ends has an opening extending therein. A plurality of heads is removably attachable to the pliers. Each of the heads comprises a heat conducting material. Each of the heads includes a pair of jaw portions each having a first end and a second end. The first ends each have a rod attached thereto defining a male coupler removably extendable into one of the female couplers for frictionally coupling the jaw portions to the elongate member. An electric heating means is in communication with the distal portions of the elongated members. A pair of wires may be abutted together by the jaws and soldered together.

In these respects, the soldering tool according to the present invention substantially departs from the conventional concepts and designs of the prior art, and in so doing provides an apparatus primarily developed for the purpose of holding wires together such that solder may be applied.

SUMMARY OF THE INVENTION

In view of the foregoing disadvantages inherent in the known types of soldering devices now present in the prior art, the present invention provides a new soldering tool construction wherein the same can be utilized for holding wires together such that solder may be applied.

The general purpose of the present invention, which will be described subsequently in greater detail, is to provide a new soldering tool apparatus and method which has many of the advantages of the soldering devices mentioned heretofore and many novel features that result in a new soldering tool which is not anticipated, rendered obvious, suggested, or even implied by any of the prior art soldering devices, either alone or in any combination thereof.

To attain this, the present invention generally comprises a pliers including a pair of elongated members each having a first end and a second end. Proximal portions of the elongate members with respect to the first ends comprise a non-heat conducting material, and distal portions of the elongate members comprise a heat conducting material. The elongate members are pivotally coupled together. Each of the second ends has an opening extending therein. A plurality of heads is removably attachable to the pliers. Each of the heads comprises a heat conducting material. Each of the heads includes a pair of jaw portions each having a first end and a second end. The first ends each have a rod attached thereto defining a male coupler removably extendable into one of the female couplers for frictionally coupling the jaw portions to the elongate member. An electric heating means is in communication with the distal portions of the elongated members. A pair of wires may be abutted together by the jaws and soldered together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new soldering tool apparatus and method which has many of the advantages of the soldering devices mentioned heretofore and many novel features that result in a new soldering tool which is not anticipated, rendered obvious, suggested, or even implied by any of the prior art soldering devices, either alone or in any combination thereof.

It is another object of the present invention to provide a new soldering tool which may be easily and efficiently manufactured and marketed.

It is a further object of the present invention to provide a new soldering tool which is of a durable and reliable construction.

An even further object of the present invention is to provide a new soldering tool which is susceptible of a low cost of manufacture with regard to both materials and labor, and which accordingly is then susceptible of low prices of sale to the consuming public, thereby making such soldering tool economically available to the buying public.

Still yet another object of the present invention is to provide a new soldering tool which provides in the apparatuses and methods of the prior art some of the advantages thereof, while simultaneously overcoming some of the disadvantages normally associated therewith.

Still another object of the present invention is to provide a new soldering tool for holding wires together such that solder may be applied.

Yet another object of the present invention is to provide a new soldering tool which includes a pliers including a pair of elongated members each having a first end and a second end. Proximal portions of the elongate members with respect to the first ends comprise a non-heat conducting material, and distal portions of the elongate members comprise a heat conducting material. The elongate members are pivotally coupled together. Each of the second ends has an opening extending therein. A plurality of heads is removably attachable to the pliers. Each of the heads comprises a heat conducting material. Each of the heads includes a pair of jaw portions each having a first end and a second end. The first ends each have a rod attached thereto defining a male coupler removably extendable into one of the female couplers for frictionally coupling the jaw portions to the elongate member. An electric heating means is in communication with the distal portions of the elongated members. A pair of wires may be abutted together by the jaws and soldered together.

Still yet another object of the present invention is to provide a new soldering tool that has removable heads so that the user is not limited by the size of the head when soldering wires or pipes together.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
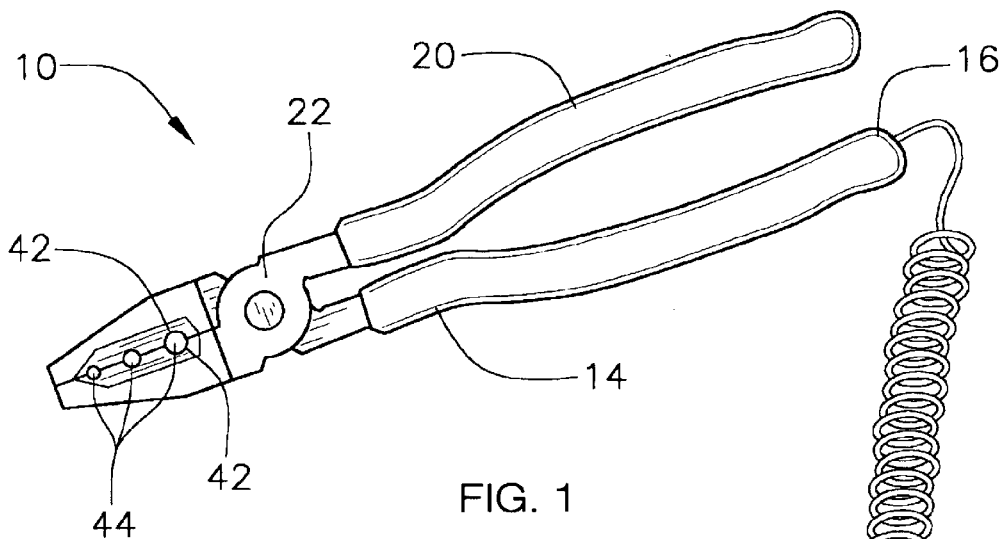
FIG. 1 is a schematic side view of a new soldering tool according to the present invention.
Figure 2:
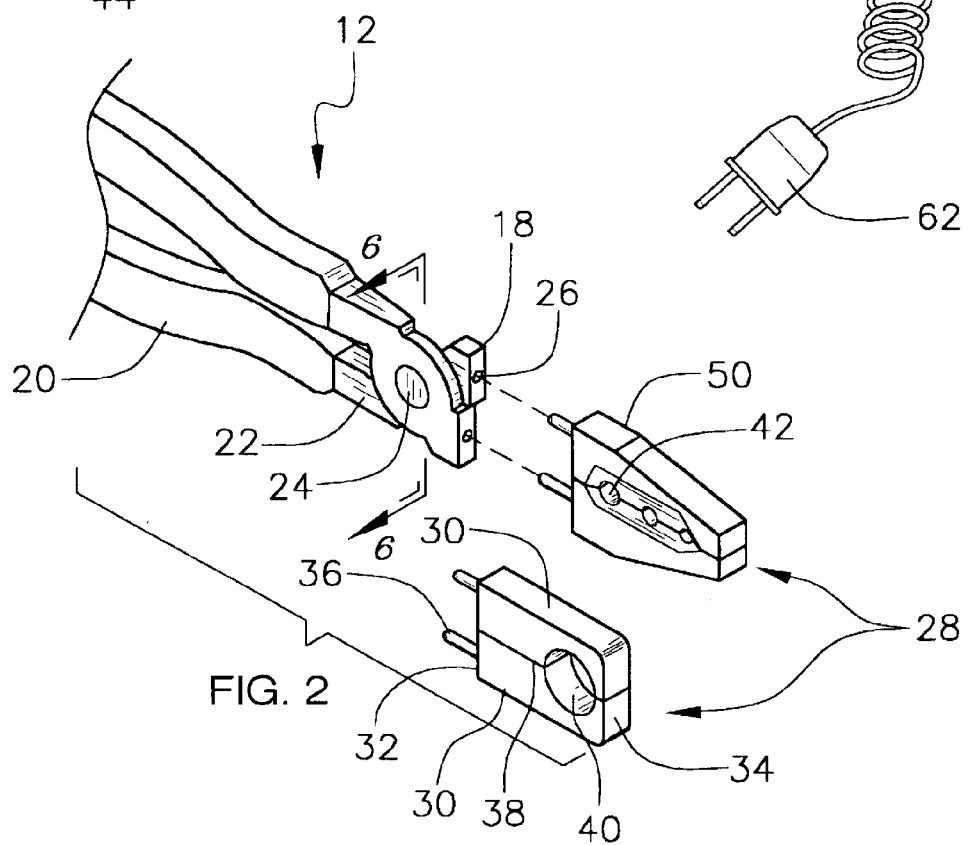
FIG. 2 is a schematic perspective view of the present invention.
Figure 3:
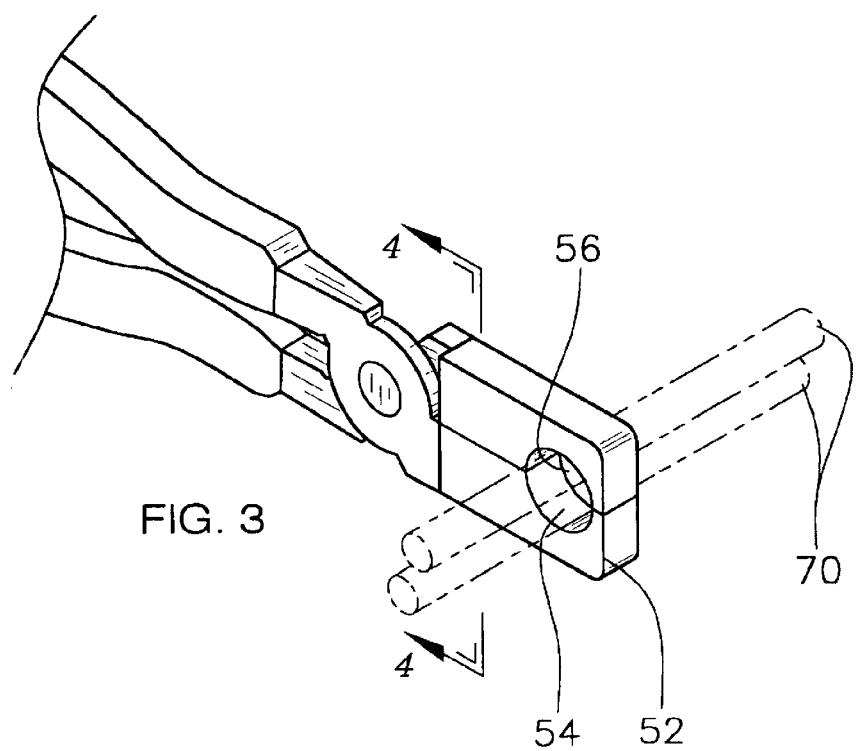
FIG. 3 is a schematic perspective view of the present invention.
Figure 4:
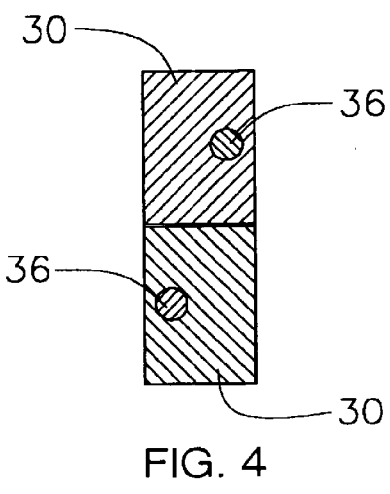
FIG. 4 is a schematic cross-sectional view of the present invention.
Figure 5:
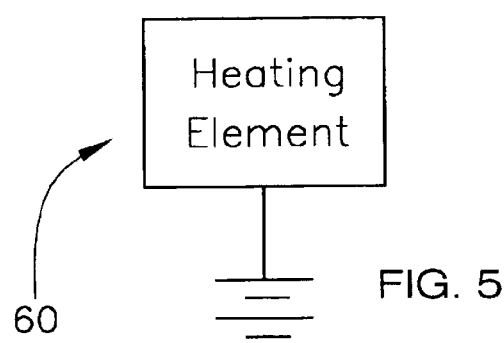
FIG. 5 is a schematic view of the present invention.
Figure 6:
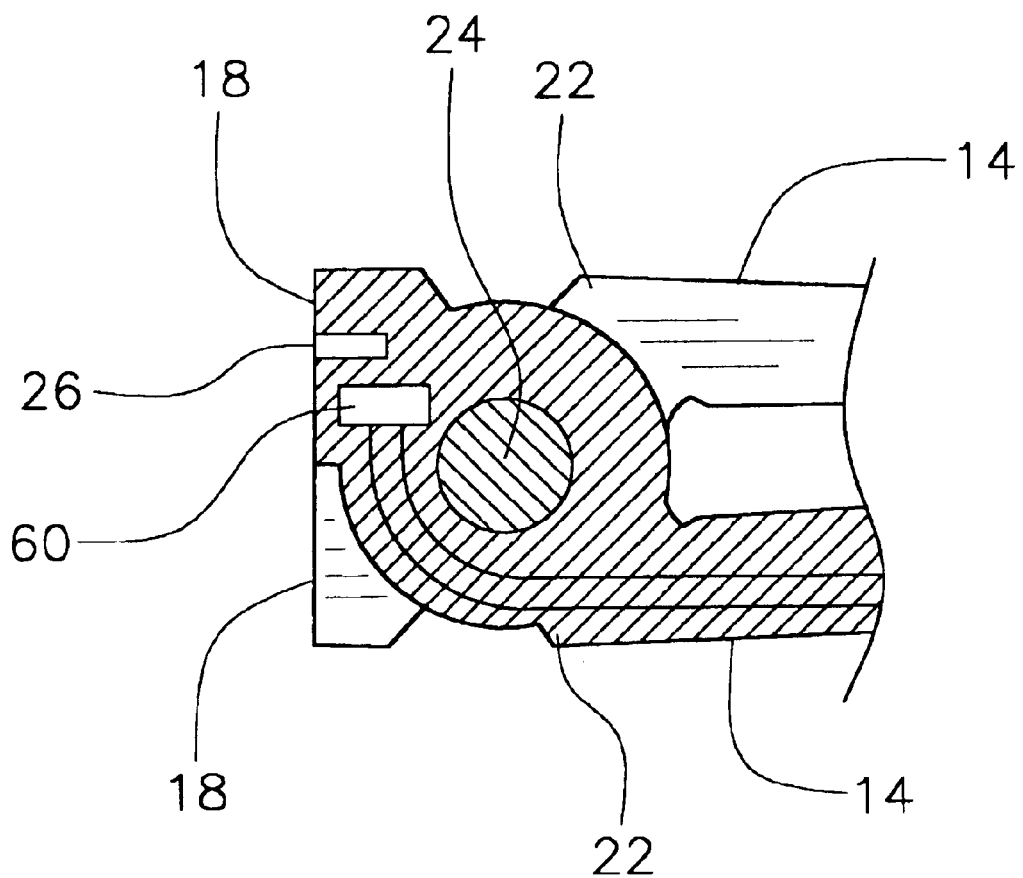
FIG. 6 is a schematic cross-sectional view of the present invention taken along line 6—6 of FIG. 2.

With reference now to the drawings, and in particular to FIGS. 1 through 5 thereof, a new soldering tool embodying the principles and concepts of the present invention and generally designated by the reference numeral 10 will be described.

As best illustrated in FIGS. 1 through 5, the soldering tool 10 generally comprises a pliers 12 including a pair of elongated members 14 each having a first end 16 and a second end 18. A proximal portion 20 of the elongate members 14 with respect to the first end 16 comprises a non-heat conducting material. A distal portion 22 of the elongate members 14 is a heat conducting material. The elongate members 14 are pivotally coupled together and cross each other at points generally adjacent to the second ends 18 by a pin 24 such that that the second ends 18 move toward each other when the first ends 16 are moved toward each other. Each of the second ends 18 has an opening 26 extending therein and defines a female coupler.

A plurality of heads 28 is removably attachable to the pliers 12. Each of the heads 28 comprises a heat conducting material. Each of the heads 28 includes a pair of jaw portions 30. Each of the jaw portions 30 has a first end 32 and a second end 34. The first ends 32 of the jaw portions 30 have a rod 36 attached thereto and extend away therefrom. Each of the rods 36 defines a male coupler removably extendable into one of the female couplers 26 for frictionally coupling the jaw portions 30 to the elongate member 14. The jaw portions 30 each have an inner surface 38. The inner surfaces 38 of a pair of jaw portions 30 generally face each other. Generically, each of the heads 28 has at least one hole 40 extending therethrough. A line extending through the hole 40 is orientated generally perpendicular to a longitudinal axis of the elongate members 14 when the head 28 is attached to the pliers 12. The hole 40 extends through each of the jaw portions 30. Each of the heads 28 has a hole 40 having a different size.

Ideally, each of the inner surfaces 38 of the jaw portions 30 of a first head 50 has a plurality of arcuate depressions 42 therein. Each of the depressions 42 in a first of the jaw portions 30 is alignable with one of the depressions 42 in a second of the jaw portions such that a plurality of openings 44 are defined extending Openings 44 being generally synonymous with "hole 40." Each of the openings 44 has a different size.

Ideally, each of the inner surfaces 38 of the jaw portions 30 of a second head 52 has an arcuate channel 54 therein. The channel in a first of the jaw portions is alignable with the channel in a second of the jaw portions of the second head 52 such that an aperture 56 is defined extending through the second head 52 when the jaw portions 30 are abutting. Aperture 56 being generally synonymous with "hole 40." The aperture has a diameter greater than a largest opening extending through the first head.

An electric heating means 60 is in communication with the distal portions 22 of the elongated members 14. The heating means 60 heats the distal portions 22 such that heat is transferred to an abutting pair of jaw portions 30. The heating means 60 comprises an electric heating element extending through one of the elongate members. The heating element is electrically coupled to a plug 62 for supplying electricity to the heating element. The electric heating means 60 may be any conventional heating means typically used for soldering, such as shown in U.S. Pat. No. 4,086,465.

In use, wherein wires 70 may be crimped in one of the openings 44, or holes 40. The user may then place solder upon the wires 70 with a free hand to solder the wires together when the jaw portions 30 have attained a sufficient degree of heat. The heads 28 having larger holes 40, or apertures 56, may be used for soldering pipes together in a similar manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A soldering pliers device for soldering together a plurality of wires, said device comprising:
    a pliers including a pair of elongated members each having a first end and a second end, a proximal portion of said elongate members with respect to said first end comprising a non-heat conducting material, a distal portion of said elongate members being heat conducting material, said elongate members being pivotally coupled together and crossing each other at points generally adjacent to said second ends by a pin such that that said second ends move toward each other when said first ends are moved toward each other, each of said second ends having an opening extending therein and defining a female coupler;
    a plurality of heads for removably attaching to said pliers, each of said heads comprising a heat conducting material, each of said heads comprising a pair of jaw portions, each of said jaw portions having a first end and a second end, each of said first ends having a rod attached thereto and extending away therefrom, each of said rods defining a male coupler removably extendable into one of said female couplers for frictionally coupling said jaw portions to said elongate member;
    an electric heating means being in communication with said distal portions of said elongated members, said electric heating means heating said heat conducting material of said distal portion of each of said elongated members such that said distal portion of each of said elongated members transfers heat to said heat conducting material of one of said heads when one of said heads is coupled to said distal portion of said elongated members; and
    wherein a pair of wires may be abutted together by said jaws and soldered together.

2. The soldering pliers device as in claim 1, wherein a first head includes a pair of jaw portions each having an inner surface, said inner surfaces of a pair of jaw portions generally facing each other, each of said inner surfaces of said jaw portions of a first head having a plurality of arcuate depressions therein, each of said depressions in a first of said jaw portions being alignable with one of said depressions in a second of said jaw portions such that a plurality of openings are defined extending through said first head when said jaw portions are abutting, each of said openings having a different size.

3. The soldering pliers device as in claim 2, wherein a second head includes a pair of jaw portions each having an inner surface, said inner surfaces of a pair of jaw portions generally facing each other, each of said inner surfaces of said jaw portions of a second head having an arcuate channel therein, said channel in a first of said jaw portions being alignable with said channel in a second of said jaw portions of said second head such that an aperture is defined extending through said second head when said jaw portions are abutting, said aperture having a diameter greater than a largest opening extending through said first head.

4. The soldering pliers device as in claim 1, wherein said heating means comprises an electric heating element extending through one of said elongate members, said heating element being electrically coupled to a plug for supplying electricity to said heating element.

5. The soldering pliers device as in claim 1, wherein each of said heads having at least one hole extending therethrough, a line extending through said hole being orientated generally perpendicular to a longitudinal axis of said elongate members when said head is attached to said pliers, said hole extending through each of said jaw portions of said head, each of said heads having a hole having a different size.

6. A soldering pliers device for soldering together a plurality of wires, said device comprising:
    a pliers including a pair of elongated members each having a first end and a second end, a proximal portion of said elongate members with respect to said first end comprising a non-heat conducting material, a distal portion of said elongate members being heat conducting material, said elongate members being pivotally coupled together and crossing each other at points generally adjacent to said second ends by a pin such that that said second ends move toward each other when said first ends are moved toward each other, each of said second ends having an opening extending therein and defining a female coupler;
    a plurality of heads for removably attaching to said pliers, each of said heads comprising a heat conducting material, each of said heads comprising a pair of jaw portions, each of said jaw portions having a first end and a second end, each of said first ends having a rod attached thereto and extending away therefrom, each of said rods defining a male coupler removably extendable into one of said female couplers for frictionally coupling said jaw portions to said elongate member, each of said jaw portions having an inner surface, said inner surfaces of a pair of jaw portions generally facing each other;
    each of said inner surfaces of said jaw portions of a first head having a plurality of arcuate depressions therein, each of said depressions in a first of said jaw portions being alignable with one of said depressions in a second of said jaw portions such that a plurality of openings are defined extending through said first head when said jaw portions are abutting, each of said openings having a different size;
    each of said inner surfaces of said jaw portions of a second head having an arcuate channel therein, said channel in a first of said jaw portions being alignable with said channel in a second of said jaw portions of said second head such that an aperture is defined extending through said second head when said jaw portions are abutting, said aperture having a diameter greater than a largest opening extending through said first head;

an electric heating means being in communication with said distal portions of said elongated members, said electric heating means heating said heat conducting material of said distal portion of each of said elongated members such that said distal portion of each of said elongated members transfers heat to said heat conducting material of one of said heads when one of said heads is coupled to said distal portion of said elongated members, said heating means comprising an electric heating element extending through one of said elongate members, said heating element being electrically coupled to a plug for supplying electricity to said heating element; and wherein wires may be crimped in one of said openings and soldered together when said jaw portions have attained a sufficient degree of heat.

* * * * *